United States Patent
Lim et al.

(10) Patent No.: US 9,874,341 B2
(45) Date of Patent: Jan. 23, 2018

(54) DOUBLE FRESNEL PIR LENS

(71) Applicant: Cree, Inc., Durham, NC (US)

(72) Inventors: Jin Hong Lim, Cary, NC (US); Kurt S. Wilcox, Libertyville, IL (US); Jason Taylor, Cary, NC (US)

(73) Assignee: Cree, Inc., Durham, NC (US)

( * ) Notice: Subject to any disclaimer, the term of this patent is extended or adjusted under 35 U.S.C. 154(b) by 182 days.

(21) Appl. No.: 14/753,678

(22) Filed: Jun. 29, 2015

(65) Prior Publication Data
US 2016/0377275 A1 Dec. 29, 2016

(51) Int. Cl.
*F21V 23/00* (2015.01)
*F21V 23/04* (2006.01)
*G01J 1/02* (2006.01)
*G01J 1/04* (2006.01)
*F21V 29/77* (2015.01)
*G01J 5/08* (2006.01)
*F21V 5/04* (2006.01)
*F21V 13/04* (2006.01)
*F21Y 115/10* (2016.01)
*F21Y 113/10* (2016.01)
(Continued)

(52) U.S. Cl.
CPC ...... *F21V 23/0464* (2013.01); *F21V 23/0471* (2013.01); *F21V 29/777* (2015.01); *G01J 1/0266* (2013.01); *G01J 1/0271* (2013.01); *G01J 1/0411* (2013.01); *G01J 5/0806* (2013.01); *F21V 5/04* (2013.01); *F21V 13/04* (2013.01); *F21V 23/002* (2013.01); *F21Y 2113/10* (2016.08); *F21Y 2113/13* (2016.08); *F21Y 2115/10* (2016.08); *G01J 2001/4247* (2013.01)

(58) Field of Classification Search
CPC ............. F21V 23/0442; F21V 23/0464; F21V 23/0471; F21V 13/04; F21V 5/04; F21V 5/045; G01J 1/0411; G01J 1/0422; F21Y 2115/10
See application file for complete search history.

(56) References Cited

U.S. PATENT DOCUMENTS 5,442,532 A * 8/1995 Boulos .................... F21S 8/033
340/567
5,712,622 A * 1/1998 Grossinger .......... G08B 13/193
340/555
(Continued)

*Primary Examiner* — Peggy Neils
(74) *Attorney, Agent, or Firm* — Withrow & Terranova, P.L.L.C.

(57) ABSTRACT

A sensor module for a lighting fixture includes a module housing configured to be mounted to a lighting fixture, a light sensor mounted in the module housing, and a sensor cover over the light sensor. The sensor cover includes a first surface oriented to face a task surface within an area of interest, and a second surface opposite the first surface. The first surface includes a first Fresnel lens having a number of Fresnel ridges oriented in a first direction. The second surface includes a second Fresnel lens having a number of Fresnel ridges oriented in a second direction, which is different from the first direction. Providing the first Fresnel lens and the second Fresnel lens with differently oriented Fresnel ridges allows the sensor cover to focus light from a relatively large portion of the task surface to the light sensor while remaining small.

23 Claims, 14 Drawing Sheets

(51) Int. Cl.
*F21Y 113/13* (2016.01)
*G01J 1/42* (2006.01)

(56) References Cited

U.S. PATENT DOCUMENTS

| | | | | |
|---|---|---|---|---|
| 6,175,309 | B1* | 1/2001 | Drake | G08B 13/193 |
| | | | | 250/342 |
| 7,375,313 | B2* | 5/2008 | Lee | F21S 8/033 |
| | | | | 250/221 |
| 7,507,000 | B2* | 3/2009 | Cho | H04M 1/22 |
| | | | | 362/23.18 |
| 8,049,639 | B2* | 11/2011 | Sibalich | F21S 8/02 |
| | | | | 340/693.11 |
| 8,636,385 | B2* | 1/2014 | Fabbri | F21S 8/02 |
| | | | | 362/148 |
| 8,890,844 | B2* | 11/2014 | Hung | G06F 3/03547 |
| | | | | 345/166 |
| 9,000,378 | B2* | 4/2015 | Oi | G01J 1/0266 |
| | | | | 250/353 |
| 9,521,727 | B1* | 12/2016 | Clements | H05B 37/0227 |
| 2004/0246723 | A1* | 12/2004 | Graves | F21V 23/0442 |
| | | | | 362/276 |
| 2012/0306377 | A1* | 12/2012 | Igaki | H05B 33/0854 |
| | | | | 315/151 |
| 2015/0204491 | A1* | 7/2015 | Yuan | F21V 5/007 |
| | | | | 362/311.02 |

* cited by examiner

DOUBLE FRESNEL PIR LENS

FIELD OF THE DISCLOSURE

The present disclosure relates to sensor modules for lighting fixtures.

BACKGROUND

Modern lighting fixtures continue to evolve, incorporating features such as controllers, sensors, remote modules, and the like. These controllers, sensors, and remote modules may allow a lighting fixture to implement lighting programs, respond to the surrounding environment, and be controlled, for example, over a local area network and/or the Internet. A number of different sensors may be incorporated into a lighting fixture in order to provide information about the surrounding environment. For example, a lighting fixture may include an ambient light sensor to gather information about the ambient light level in the area around the lighting fixture. Additionally, a lighting fixture may include an occupancy sensor to detect when an individual is located near the lighting fixture. While referred to herein as "light sensors," the sensors discussed herein may detect energy either within the visual spectrum or outside of the visual spectrum (e.g., infrared energy). Incorporating sensors such as those discussed above into a lighting fixture often provides valuable information that can be used to implement additional functionality, many sensors such as those mentioned above that measure light or other energy of one kind or another must have a line-of-sight to the surrounding environment. Further, it is often desirable to give these light sensors access to the largest possible area surrounding a lighting fixture in order to provide the maximum amount of information about the surrounding area. In other cases, it is desirable to provide a precise detection area for a light sensor. Generally, the particular goal of the light sensor will dictate the extent of the desirable coverage area.

When incorporating a sensor into a sensor module, the sensor generally must be covered by a sensor cover of some kind. Due to the requirements of many light-based sensors discussed above (i.e., line-of-sight to surrounding environment and access to a large surrounding area), sensor modules incorporating light sensors often include bulky and aesthetically unappealing sensor covers. For example, many conventional sensor modules include dome shaped sensor covers, and therefore substantially extrude from a lighting fixture, detracting from the aesthetic appeal thereof. Due to the size of these sensor module covers, many are located remotely from the lighting fixtures that they service, requiring separate installation and providing only limited information about the area directly surrounding the lighting fixture itself. Further, the detection area of these sensor covers is often limited.

Accordingly, there is a need for a sensor module for a lighting fixture including a compact sensor cover capable of capturing light from a large surrounding area.

SUMMARY

The present disclosure relates to sensor modules for lighting fixtures. In one embodiment, a sensor module for a lighting fixture includes a module housing configured to be mounted to a lighting fixture, a light sensor mounted in the module housing, and a sensor cover over the light sensor. The sensor cover includes a first surface oriented to face a task surface within an area of interest, and a second surface opposite the first surface. The first surface includes a first Fresnel lens having a number of Fresnel ridges oriented in a first direction. The second surface includes a second Fresnel lens having a number of Fresnel ridges oriented in a second direction, which is different from the first direction. Providing the first Fresnel lens and the second Fresnel lens with differently oriented Fresnel ridges allows the sensor cover to focus light from a relatively large portion of the task surface to the light sensor while remaining small.

In one embodiment, the first direction is perpendicular to the second direction. The pattern of the Fresnel ridges of the first Fresnel lens may differ from the pattern of the Fresnel ridges of the second Fresnel lens in various embodiments.

In one embodiment, the sensor cover provides a field of view greater than about 324 ft$^2$ for a working distance of about 12.5 ft. Further, the sensor cover may provide a field of view greater than about 900 ft$^2$ for a working distance of about 21.5 ft.

In one embodiment, a lighting fixture includes a light source, a housing coupled to the light source, and a module housing. The housing includes an opening through which light from the light source is emitted. The module housing is configured to be mounted to the lighting fixture, and includes a light sensor mounted therein and a sensor cover over the light sensor. The sensor cover includes a first surface oriented to face a task surface within an area of interest, and a second surface opposite the first surface. The first surface includes a first Fresnel lens having a number of Fresnel ridges oriented in a first direction. The second surface includes a second Fresnel lens having a number of Fresnel ridges oriented in a second direction, which is different from the first direction. Providing the first Fresnel lens and the second Fresnel lens with differently oriented Fresnel ridges allows the sensor cover to focus light from a relatively large portion of the task surface to the light sensor while remaining small.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
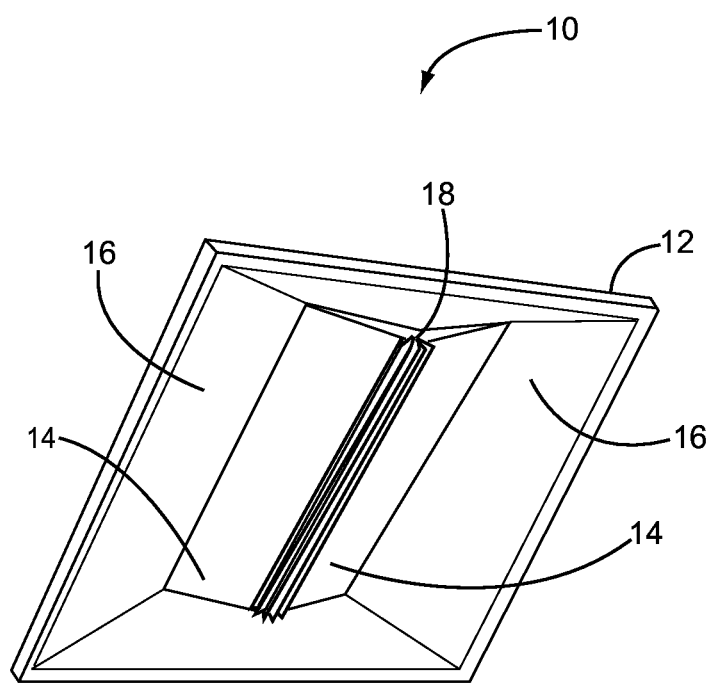
FIG. 1 illustrates a lighting fixture according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Prior to delving into the details of the present disclosure, an overview of an exemplary lighting fixture is provided. While the concepts of the present disclosure may be employed in any type of lighting system, the immediately following description describes these concepts in a troffer-type lighting fixture, such as a lighting fixture 10 illustrated in FIGS. 1-3. This particular lighting fixture 10 is substantially similar to the CR and CS series of troffer-type lighting fixtures that are manufactured by Cree, Inc. of Durham, N.C.

While the disclosed lighting fixture 10 employs an indirect lighting configuration wherein light is initially emitted upward from a light source and then reflected downward, direct lighting configurations may also take advantage of the concepts of the present disclosure. In addition to troffer-type lighting fixtures, the concepts of the present disclosure may also be employed in recessed lighting configurations, wall mount lighting configurations, outdoor lighting configurations, and the like. Further, the functionality and control techniques described below may be used to control different types of lighting fixtures, as well as different groups of the same or different types of lighting fixtures at the same time.

Figure 2:
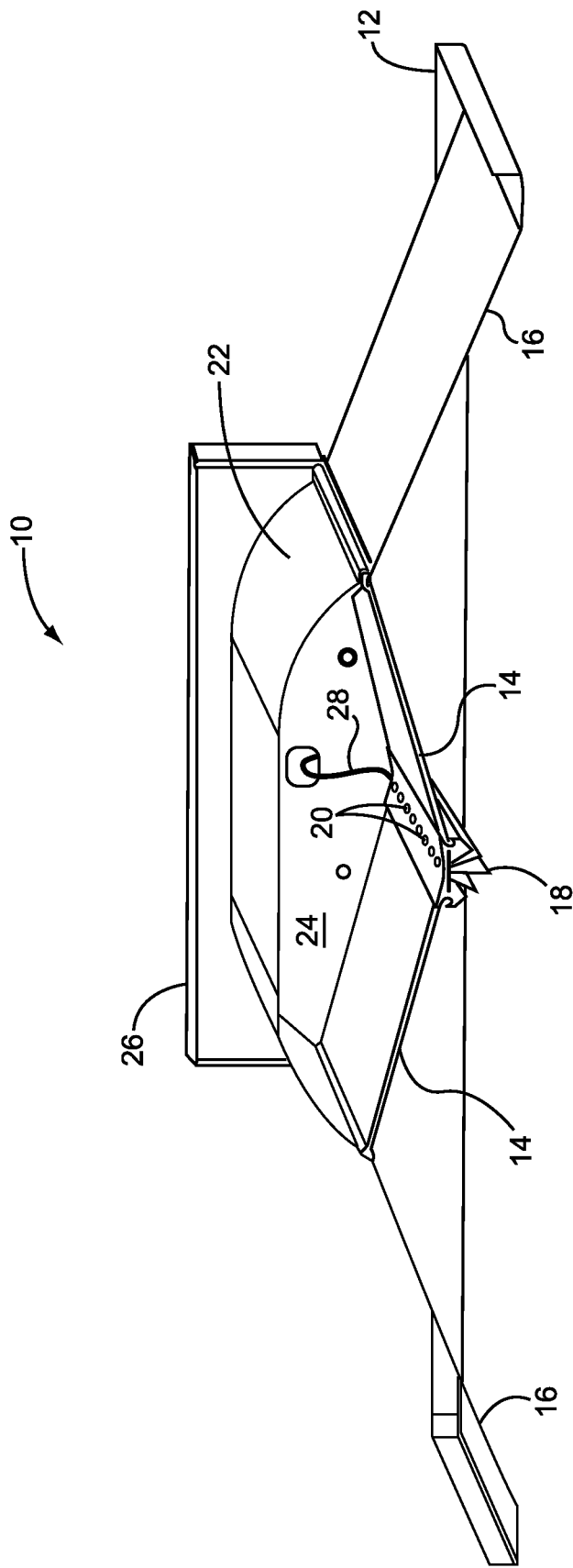
FIG. 2 illustrates a lighting fixture according to an additional embodiment of the present disclosure.
Figure 3:
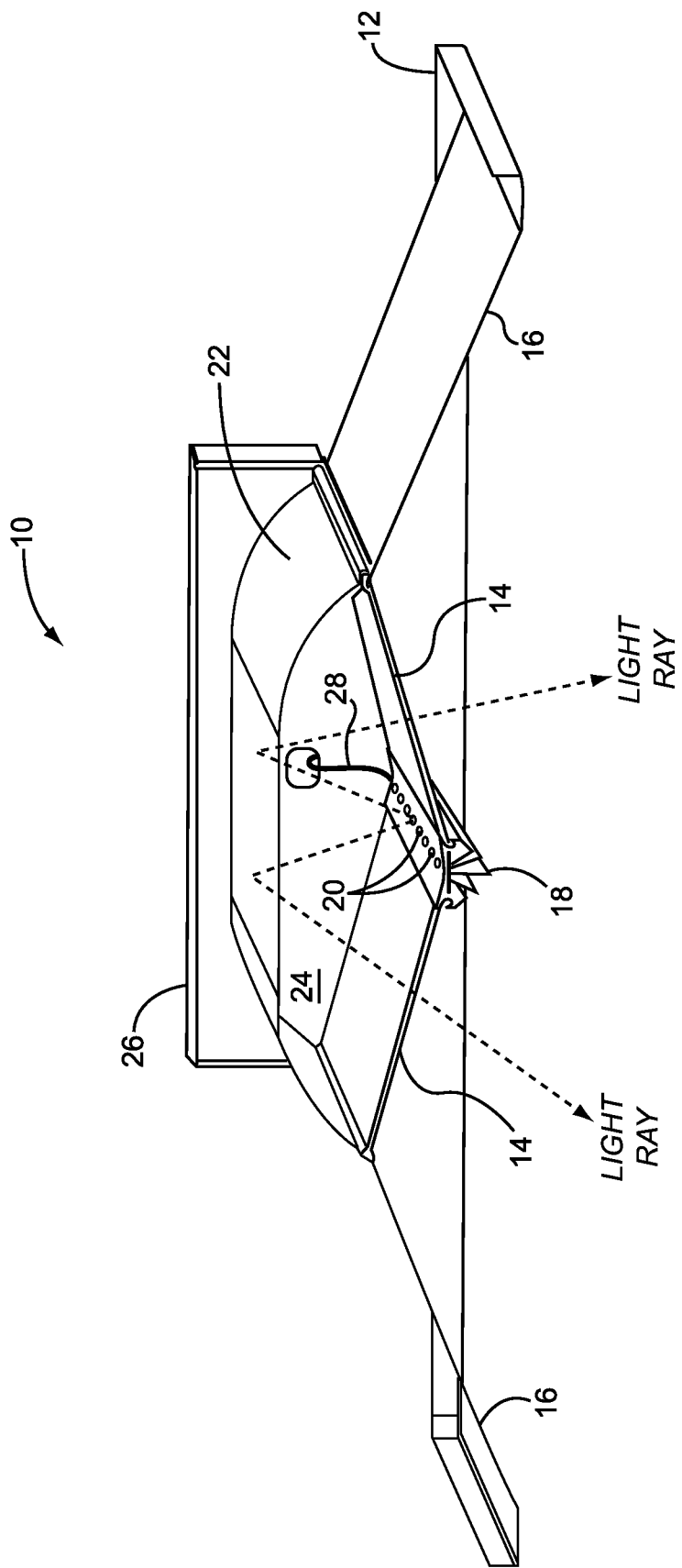
FIG. 3 illustrates a lighting fixture according to an additional embodiment of the present disclosure.

In general, troffer-type lighting fixtures, such as the lighting fixture 10, are designed to mount in a ceiling. In most applications, the troffer-type lighting fixtures are mounted into a drop ceiling (not shown) of a commercial, educational, or governmental facility. As illustrated in FIGS. 1-3, the lighting fixture 10 includes a square or rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to an elongated heatsink 18, which functions to join the two inside edges of the lenses 14.

Turning now to FIGS. 2 and 3 in particular, the back side of the heatsink 18 provides a mounting structure for an LED array 20, which includes one or more rows of individual LEDs mounted on an appropriate substrate. The LEDs are oriented to primarily emit light upwards toward a concave cover 22. The volume bounded by the cover 22, the lenses 14, and the back of the heatsink 18 provides a mixing chamber 24. As such, light will emanate upwards from the LEDs of the LED array 20 toward the cover 22 and will be reflected downward through the respective lenses 14 towards an area of interest, as illustrated in FIG. 3. As discussed herein, the area illuminated by the lighting fixture 10 is generally referred to as an area of interest, while a particular surface illuminated by the lighting fixture 10 is generally referred to as a task surface. Notably, not all light rays emitted from the LEDs will reflect directly off the bottom of the cover 22 and back through a particular lens 14 with a single reflection. Many of the light rays will bounce around within the mixing chamber 24 and effectively mix with other light rays, such that a desirably uniform light is emitted through the respective lenses 14.

Those skilled in the art will recognize that the type of lenses 14, the type of LEDs, the shape of the cover 22, and any coating on the bottom side of the cover 22, among many other variables, will affect the quantity and quality of light emitted by the lighting fixture 10. As will be discussed in greater detail below, the LED array 20 may include LEDs of different colors, wherein the light emitted from the various LEDs mixes together to form a white light having a desired color temperature and quality based on the design parameters for the particular embodiment.

As is apparent from FIGS. 2 and 3, the elongated fins of the heatsink 18 may be visible from the bottom of the lighting fixture 10. Placing the LEDs of the LED array 20 in thermal contact along the upper side of the heatsink 18 allows any heat generated by the LEDs to be effectively transferred to the elongated fins on the bottom side of the heatsink 18 for dissipation within the room in which the lighting fixture 10 is mounted. Again, the particular configuration of the lighting fixture 10 illustrated in FIGS. 1-3 is merely one of the virtually limitless configurations for lighting fixtures 10 in which the concepts of the present disclosure are applicable.

With continued reference to FIGS. 2 and 3, an electronics housing 26 is shown mounted at one end of the lighting fixture 10, and is used to house all or a portion of the electronics used to power and control the LED array 20. These electronics are coupled to the LED array 20 through appropriate cabling 28.

Figure 4:
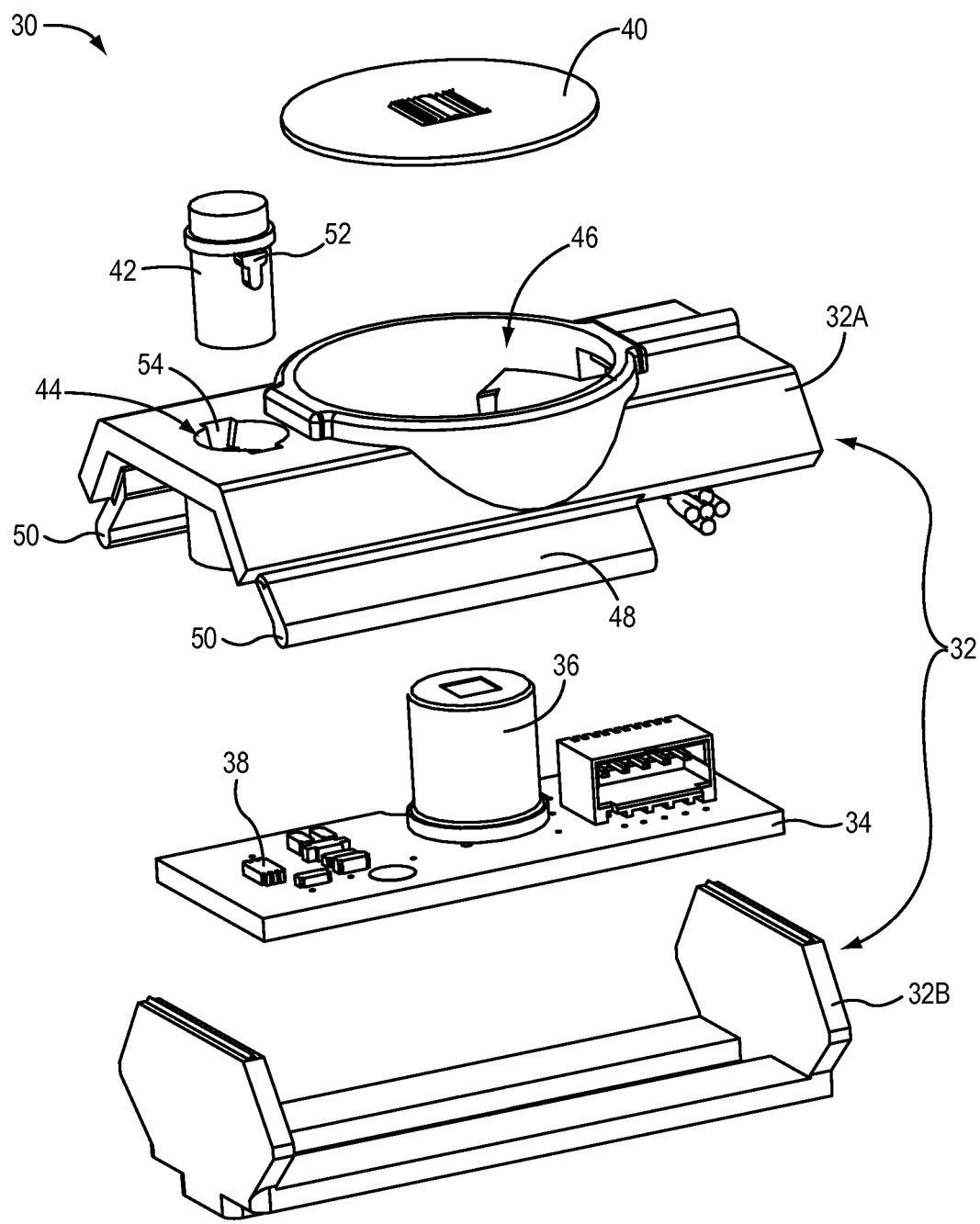
FIG. 4 illustrates a sensor module for a lighting fixture according to one embodiment of the present disclosure.

FIG. 4 shows an exploded view of a sensor module 30 that may be used along with the lighting fixture 10 in various embodiments. The sensor module 30 may be integrated into an exposed side of the heatsink 18 at one end thereof, as discussed in detail below. The sensor module 30 may include one or more sensors, such as occupancy sensors $S_O$, ambient light sensors $S_A$, temperature sensors, sound sensors (microphones), image (still or video) sensors, and the like. If multiple sensors are provided, they may be used to sense the same or different environmental conditions. If multiple sensors are used to sense the same environmental conditions, different types of sensors may be used.

As illustrated in FIG. 4, the sensor module 30 includes a housing 32, which may be divided into an upper housing 32A and a lower housing 32B, each of which is configured to attach to one another through a snap-fit connector or other attachment mechanism, such as via screws. The housing 32 supports a printed circuit board (PCB) 34 including an occupancy sensor 36 and an ambient light sensor 38. The occupancy sensor 36 may be covered by a sensor cover 40, which may be configured to accurately collect light from a particular portion of an area of interest, as discussed in detail below. A light pipe 42 may cover the ambient light sensor 38 in order to guide light from the area of interest to the ambient light sensor 38. In particular, the ambient light sensor 38 is positioned such that it is aligned directly beneath the light pipe 42 when the light pipe 42 is inserted into a light pipe receptacle 44 on the upper housing 32A. The occupancy sensor 36 may be aligned with a sensor cover opening 46 in the upper housing 32A, which is covered by the sensor cover 40. In one embodiment, the occupancy sensor 36 is an off-the-shelf passive infrared (PIR) occupancy sensor. The PCB 34 may include a connector, cabling, or a wire harness (not shown) in order to connect the PCB 34 to other circuitry in the lighting fixture 10.

The sensor module 30 may include opposing mounting tabs 48, which are used to attach the sensor module 30, for example, to the heatsink 18. In one embodiment, the outer edge of the mounting tabs 48 expands to form a bulbous edge 50. Further details regarding the mounting tabs 48 and the bulbous edge 50 are discussed below.

The light pipe 42 may snap into place in the light pipe receptacle 44. While many variants are possible, the side of the light pipe 42 may include one or more male snap-fit features 52, which are designed to releasably engage corresponding female snap-fit features 54 on the upper housing 32A. As illustrated, the light pipe 42 has two opposing male snap-fit features 52 (where only one is visible), and the upper housing 32A has two corresponding female snap-fit features 54.

The light pipe 42 is solid (as opposed to hollow) and may be formed from acrylic, polymer, glass, or the like. The light pipe 42 may include or be formed to provide various types of light filtering. Further, different lengths, configurations, and materials for the light pipe 42 may provide different optical coverage and/or filtering for different light pipes 42 that fit the same light pipe receptacle 44. Light pipes 42 with different optical characteristics, but the same general form factor may be used with a given sensor module 30. As such, the light pipe 42 may be specially selected from a number of different light pipes 42 to optimize the ambient light performance of the ambient light sensor 38 for a particular installation or environment.

The sensor cover 40 may be secured into place in the sensor cover opening 46 via any suitable mechanism. For example, the sensor cover 40 may include a raised lip, which may prevent the sensor cover 40 from sliding through the sensor cover opening 46 when the upper housing 32A is secured over the sensor cover 40. Alternatively, the sensor cover 40 may include snap-fit, rotation-fit, or pressure-fit mounting tabs that secure the sensor cover 40 within the sensor cover opening 46. The sensor cover 40 may be formed to provide various types of light filtering. Different materials selected for the sensor cover 40 may provide different types of filtering, and thus may be selected based on the particular installation or environment of the lighting fixture 10. In one embodiment, the sensor cover 40 is a material configured to pass infrared light between 7 and 14 microns. For example, the sensor cover 40 may be made of high density poly-ethylene (HDPE), high density polypropylene (HDPP), or the like.

While the sensor cover 40 is shown over the occupancy sensor 36 in FIG. 4, the sensor cover 40 may similarly be used with any other type of light sensor without departing from the principles of the present disclosure. For example, the sensor cover 40 may be used with an ambient light sensor without departing from the principles of the present disclosure.

Figure 5A:
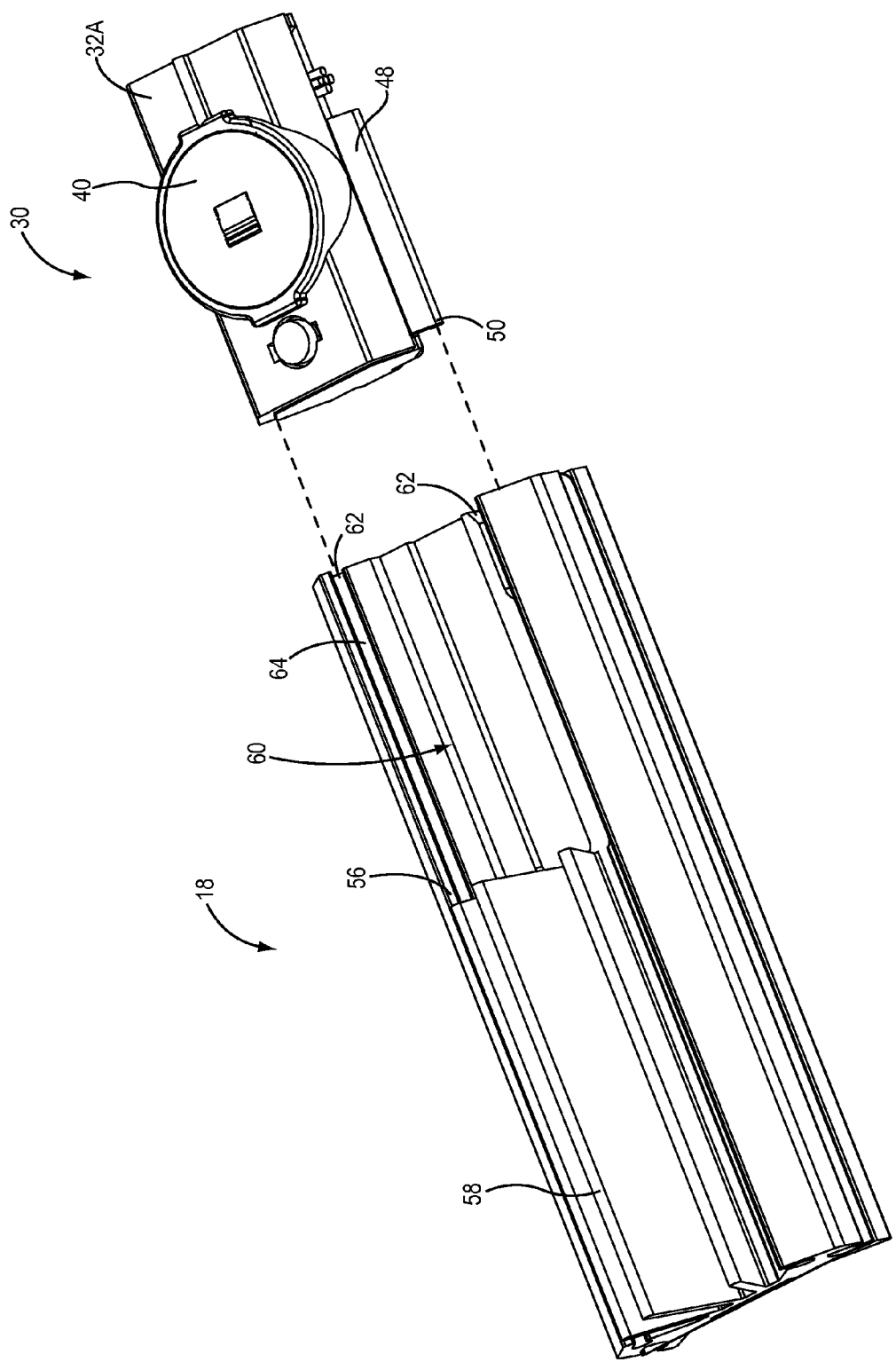
FIGS. 5A and 5B illustrate a sensor module attaching to a heatsink of a lighting fixture according to one embodiment of the present disclosure.
Figure 5B:
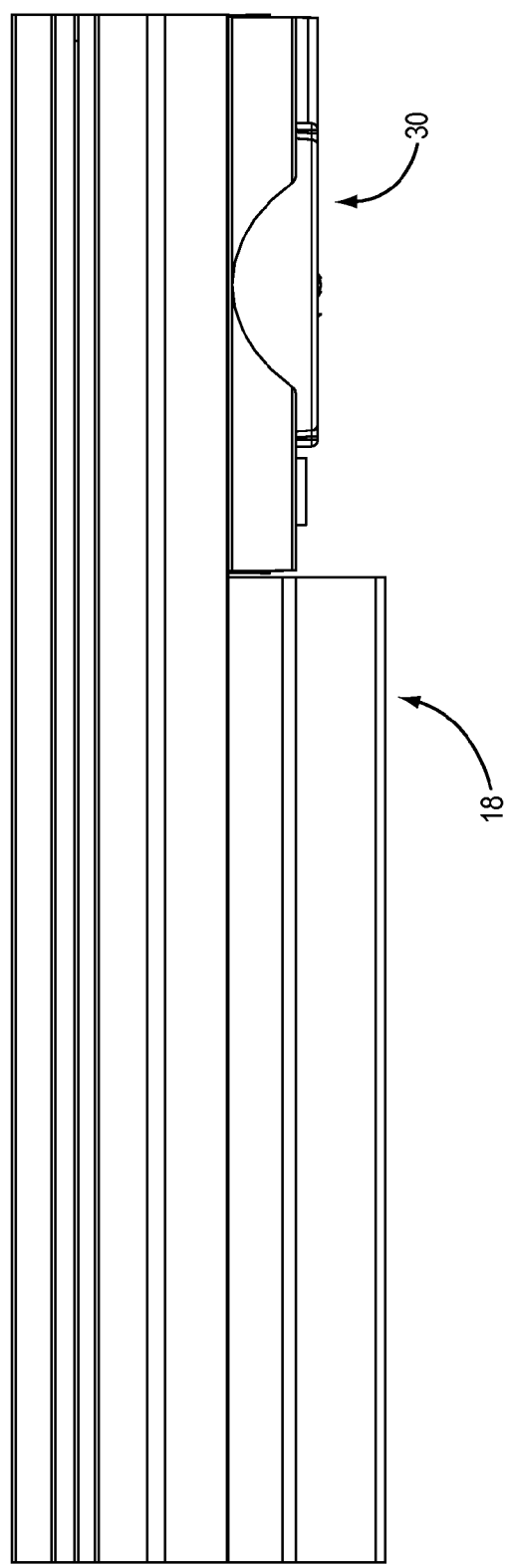

FIGS. 5A and 5B illustrate how the sensor module 30 may be attached to the heatsink 18. As illustrated in FIG. 5A, the heatsink 18 includes a main body 56, a number of fins 58, and a sensor recess 60, which is configured to receive the sensor module 30. In one embodiment, partially open bosses 62 are provided along either side of the sensor recess 60 and are configured to receive the mounting tabs 48 of the sensor module 30. The partially open bosses 62 are essentially deep holes that extend into the end of the heatsink 18 and have an elongated slot 64 that extends along all or a portion of the sides of the holes.

The bulbous edge 50 of each mounting tab 48 are sized and shaped to slide into a corresponding hole of each partially open boss 62. Effectively, the partially open bosses 62 form channels that are configured to receive the mounting tabs 48. FIG. 5B illustrates the sensor module 30 after it is axially slid into the end of the heatsink 18 and into position with the sensor recess 60. In this position, each mounting tab 48 extends through the slot 64 of one of the partially open bosses 62, and the bulbous edge 50 of each mounting tab 48 resides within the hole of the corresponding partially open boss 62.

The mounting tabs 48 and the partially open bosses 62 are configured to prevent the sensor module 30 from being removed from the sensor recess 60 radially while allowing it to slide in and out of the sensor recess 60 axially. A number of end cap mounting screws (not shown) may be partially threaded into a respective one of the partially open bosses 62 in order to secure the sensor module 30 into the sensor recess 60.

When aesthetics are important, the exposed surfaces of the sensor module 30, such as the upper housing 32A, are shaped to allow the sensor module to aesthetically blend in with the heatsink 18. For example, the angled side walls of the upper housing 32A continue the plane of the angled side walls of the main body 56 of the heatsink 18. The transition point between the angled side walls and the surface extending between the side walls of the upper housing 32A aligns with the outer fins 58 of the heatsink 18. The upper housing 32A and the lower housing 32B may have the same color as the heatsink 18. Further, the materials used to form the upper housing 32A and the lower housing 32B may be matched to the materials used for the heatsink 18. If the upper housing 32A and/or the lower housing 32B are formed of a conductive material, the PCB 34 will need to be electrically isolated therefrom. Forming the upper housing 32A and/or the lower housing 32B from insulating materials will provide electrical insulation for the PCB 34, the occupancy sensor 36, the ambient light sensor 38, and any other electrical components within the sensor module 30. FIG. 5B shows the attached sensor module 30 and the heatsink 18 from the side thereof.

Figure 6A:
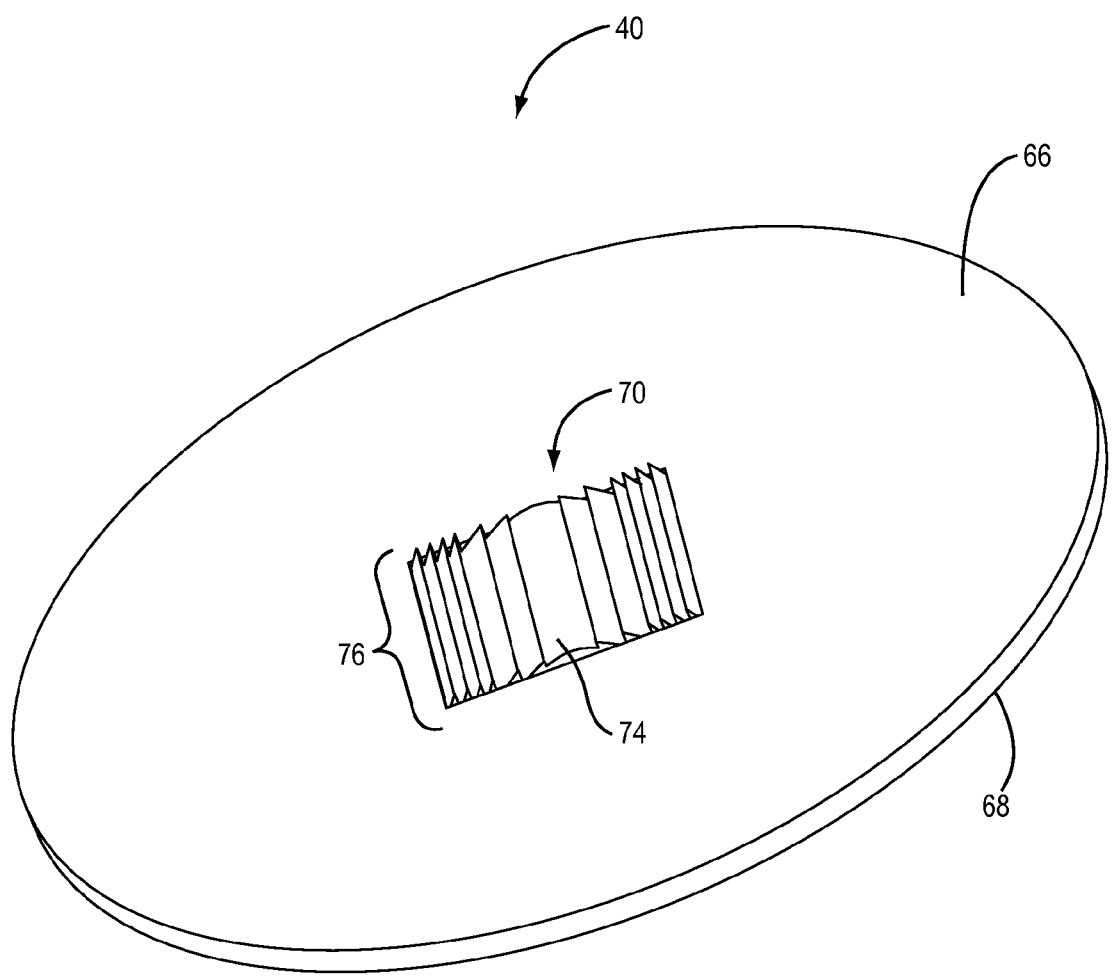
FIGS. 6A through 6G illustrate a sensor cover according to one embodiment of the present disclosure.
Figure 6B:
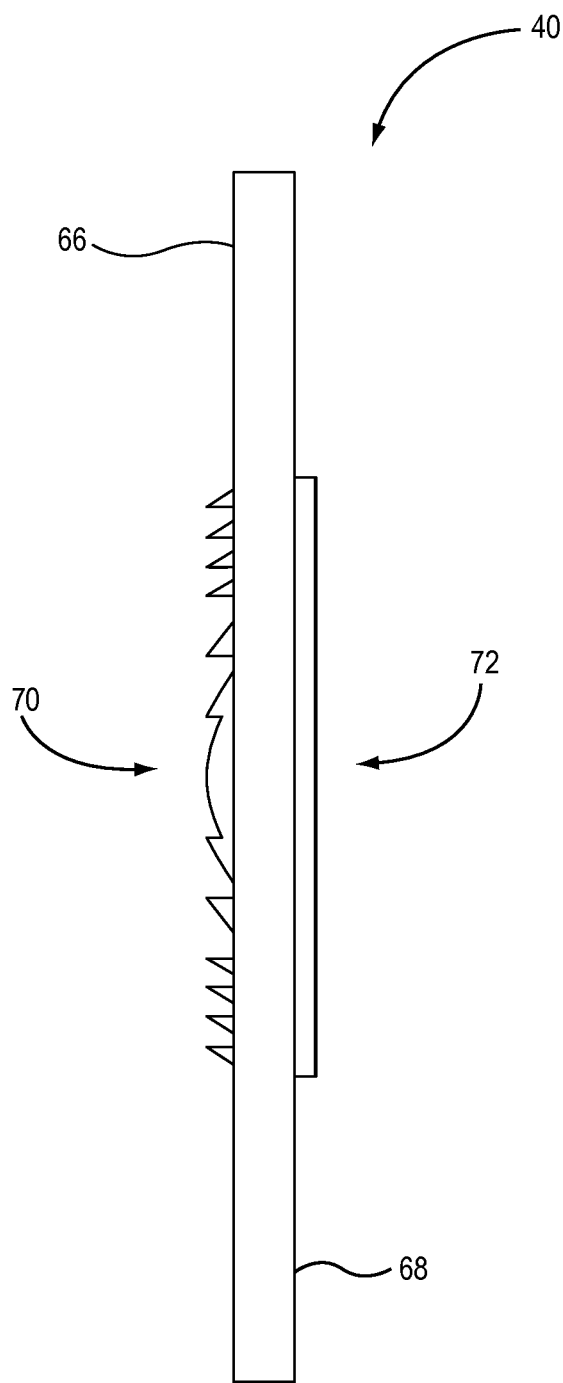
Figure 6C:
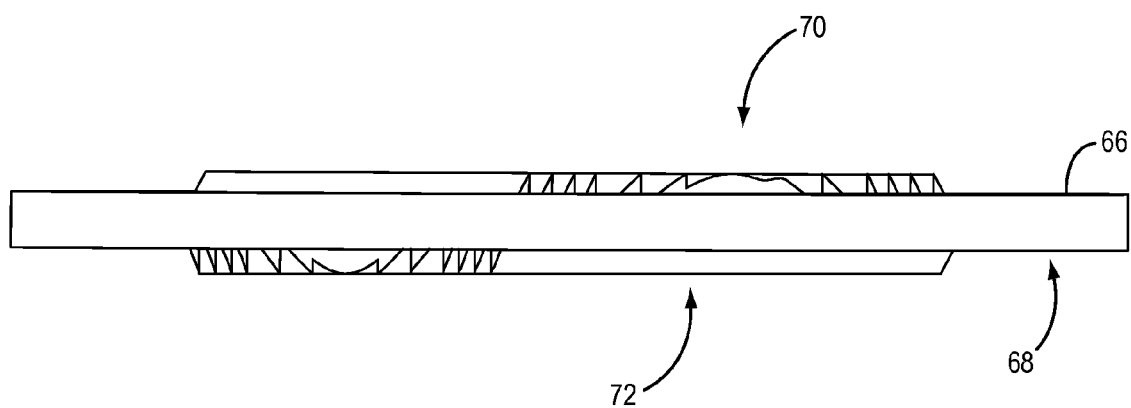
Figure 6D:
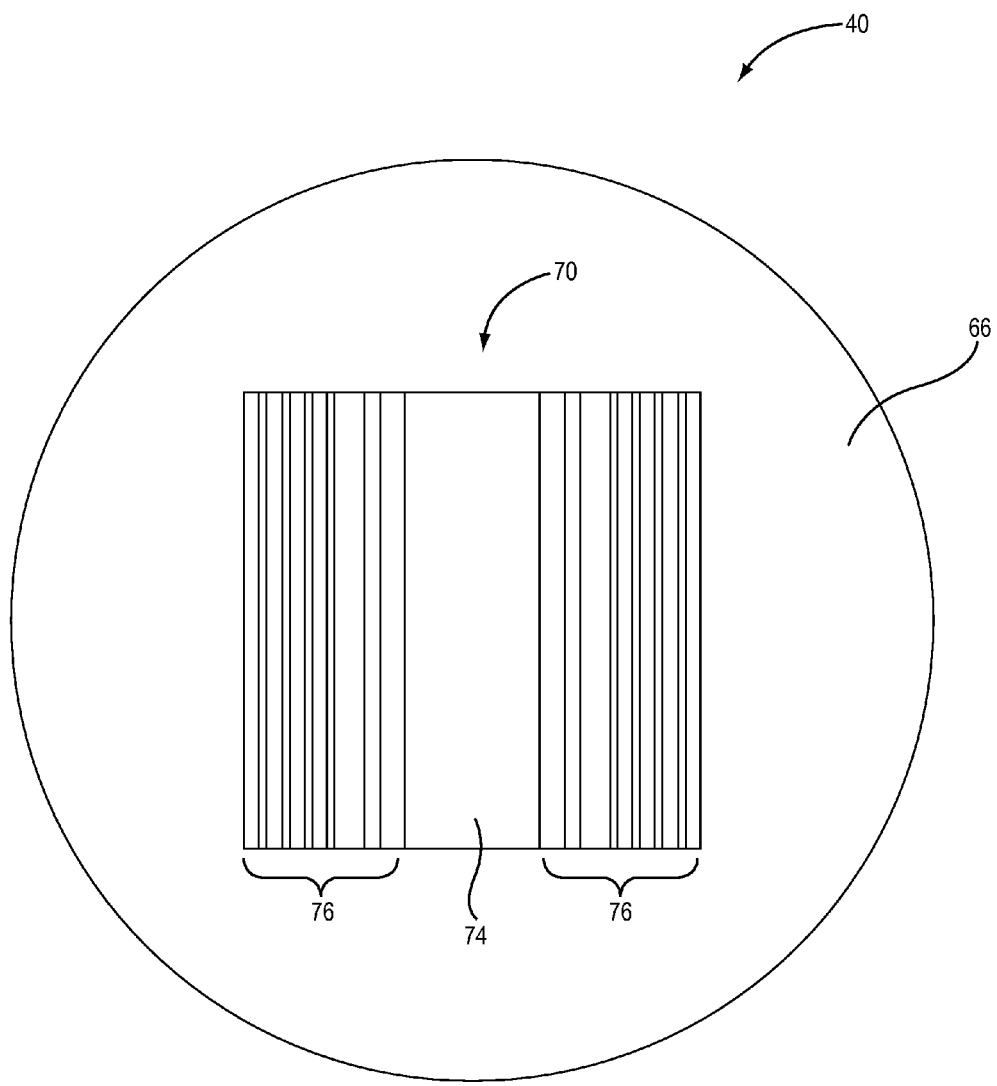
Figure 6E:
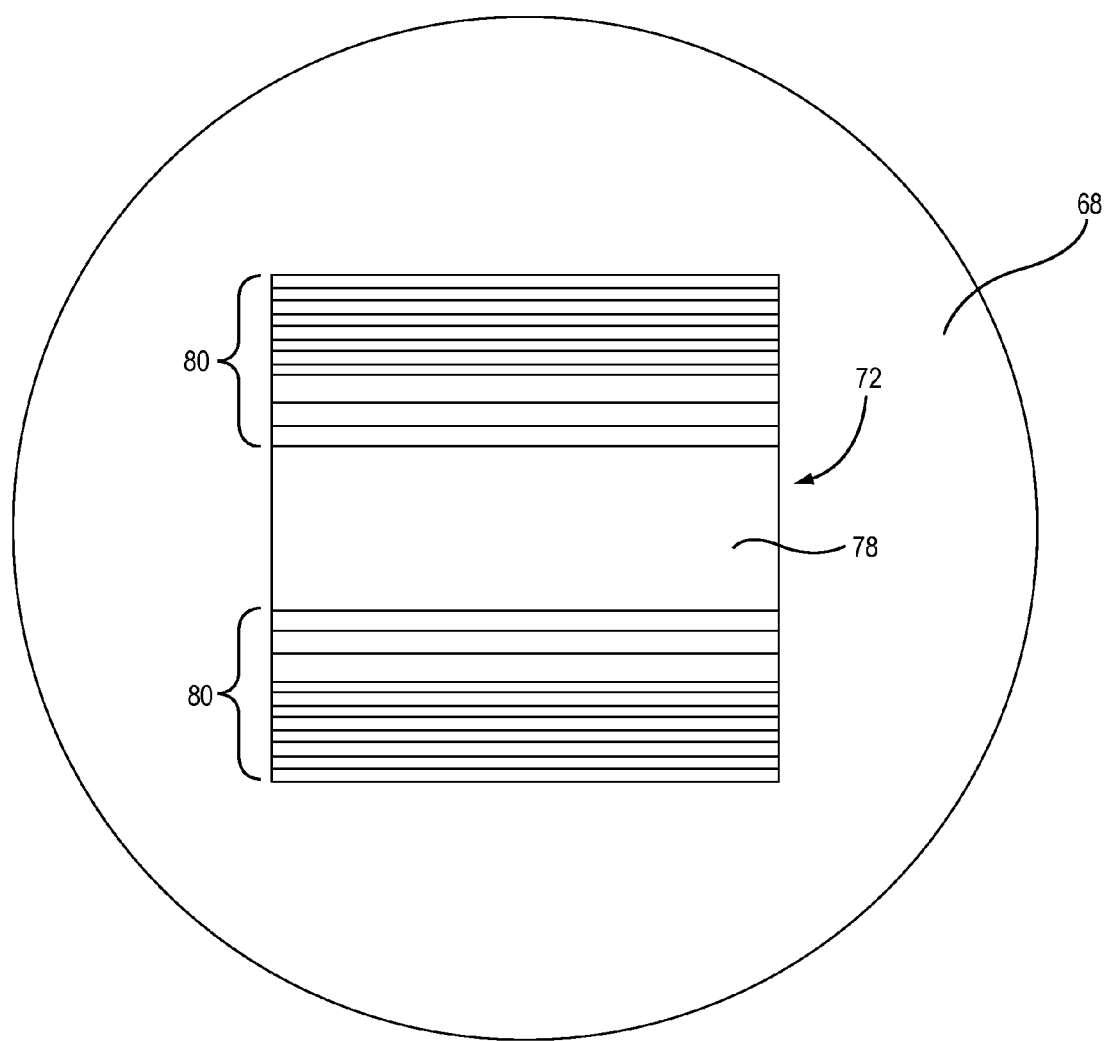

As discussed above, the sensor cover 40 is configured to provide light from a particular portion of an area of interest to the occupancy sensor 36. Details of the sensor cover 40 are shown in FIGS. 6A through 6E. Specifically, FIG. 6A shows an isometric view of the sensor cover 40, FIG. 6B shows a side view of the sensor cover 40, and FIG. 6C shows an additional side view of the front of the sensor cover 40, FIG. 6D shows a front view of the sensor cover 40, and FIG. 6E shows a back view of the sensor cover 40. The sensor cover includes a first surface 66 and a second surface 68 opposite the front surface. The first surface 66 is oriented such that it is parallel to a task surface within an area of interest, while the second surface 68 is opposite the first surface 66. The first surface 66 is substantially flat, and includes a first Fresnel lens 70 thereon. The second surface 68 includes a second Fresnel lens 72 thereon. In one embodiment, the first Fresnel lens 70 is a cylindrical Fresnel lens. Accordingly, the first Fresnel lens 70 includes a central portion 74 that is substantially cylindrical and a number of Fresnel ridges 76 adjacent to and parallel with the central portion 74. The central portion 74 along with the Fresnel ridges 76 focus light from the task surface in the area of interest towards the second Fresnel lens 72 according to mechanisms well known in the art. The second Fresnel lens 72 may also be a cylindrical Fresnel lens. Accordingly, the second Fresnel lens 72 may include a central portion 78 that is substantially cylindrical and a number of Fresnel ridges 80 adjacent to and parallel with the central portion 78. The central portion 78 along with the Fresnel ridges 80 focus light from the first Fresnel lens 70 towards the occupancy sensor 36. Notably, the central portion 74 and the Fresnel ridges 76 of the first Fresnel lens 70 have a first orientation, while the central portion 78 and the Fresnel ridges 80 of the second Fresnel lens 74 have a second orientation that is different from the first orientation. In one embodiment, the central portion 74 and the Fresnel ridges 76 of the first Fresnel lens 70 are perpendicular to the central portion 78 and the Fresnel ridges 80 of the second Fresnel lens 72.

As shown, the first Fresnel lens 70 and the second Fresnel lens 72 may be formed on only a portion of the first surface 66 and the second surface 68, respectively. Accordingly, the first Fresnel lens 70 and the second Fresnel lens 72 may be surrounded by a smooth portion of the first surface 66 and the second surface 68, respectively. While not show, in other embodiments the first Fresnel lens 72 and the second Fresnel lens 72 may occupy the entire first surface 66 and the second surface 68, respectively.

Providing the central portion 74 and the Fresnel ridges 76 of the first Fresnel lens 70 and the central portion 78 and the Fresnel ridges 80 of the second Fresnel lens 72 as described effectively forms a crossed array of convex-cylindrical lenses, which may allow the sensor cover 40 to focus light from a relatively large portion of the task surface within the area of interest to the occupancy sensor 36. For example, providing the central portion 74 and the Fresnel ridges 76 of the first Fresnel lens 70 perpendicular to the central portion 78 and the Fresnel ridges 80 of the second Fresnel lens 72 may provide a field of view of about 324 ft$^2$ at a working distance of about 12.5 ft, and may provide a field of view of about 900 ft$^2$ at a working distance of about 21.5 ft. Because the sensor cover 40 is composed of a single Fresnel lens on each surface, rather than an array of Fresnel lenses, the sensor cover 40 effectively passes all of the incident light energy to the sensor, which may increase the sensitivity thereof.

In one embodiment, the sensor cover 40 has a thickness less than 1 mm. In an additional embodiment, the sensor cover 40 may have a thickness less than 0.5 mm. The focal length of the first Fresnel lens 70 and the second Fresnel lens 72 may be about 2 mm. In one embodiment, the first Fresnel lens 70 has an area of about 24.5 mm$^2$, and the second Fresnel lens 72 has an area of about 24.5 mm$^2$.

Providing the first Fresnel lens 70 and the second Fresnel lens 72 as shown may allow the sensor cover 40 to be very small while maintain a relatively large field of view. Accordingly, the cost of the sensor cover 40 may be reduced when compared to conventional sensor covers. Further, the sensor cover may be more easily integrated into a sensor module and/or lighting fixture, and may improve the aesthetic appearance thereof as a result of its size.

The sensor cover 40 may be manufactured by any number of processes. In one embodiment, the sensor cover 40 is molded via an injection molding process. In another embodiment, the sensor cover 40 is milled out of a piece of material, for example, via a computer numerical control (CNC) router or mill. In yet another embodiment, the sensor cover 40 is printed via a three-dimensional (3D) printer.

Figure 6F:
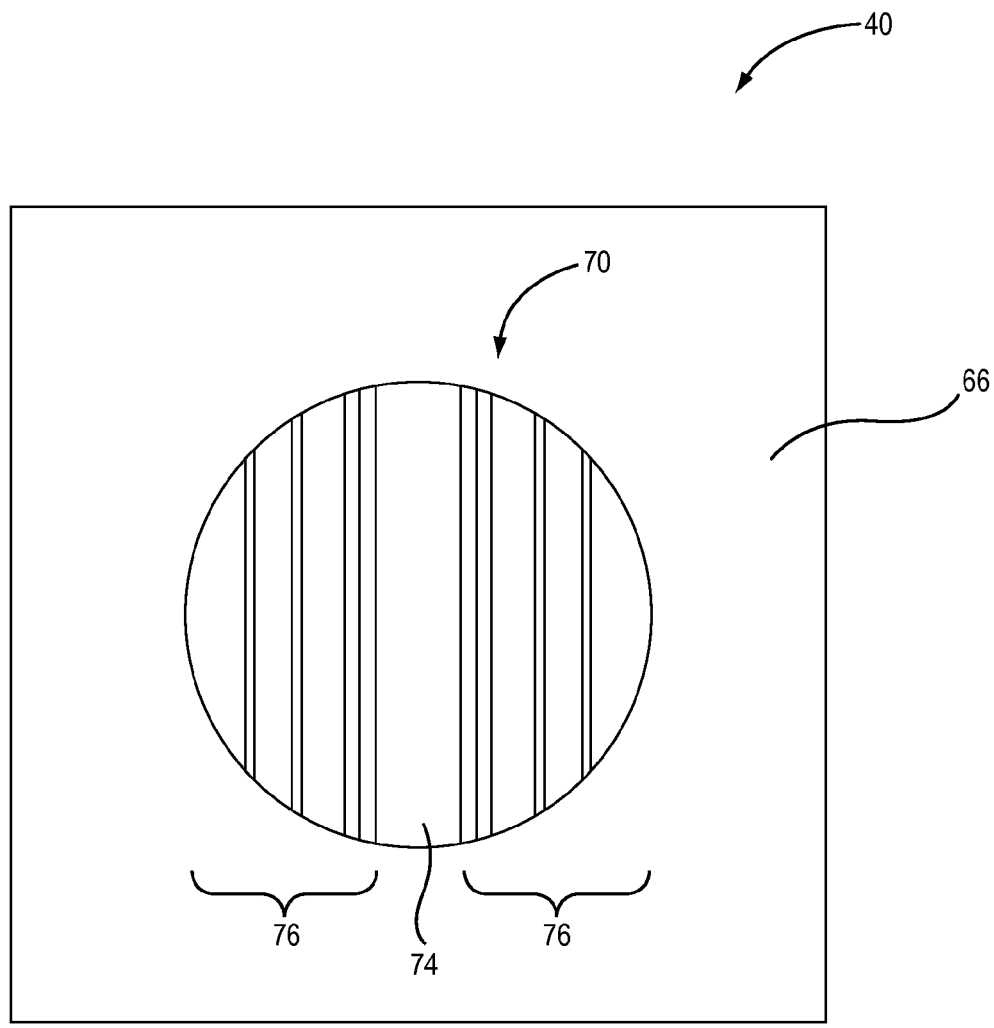
Figure 6G:
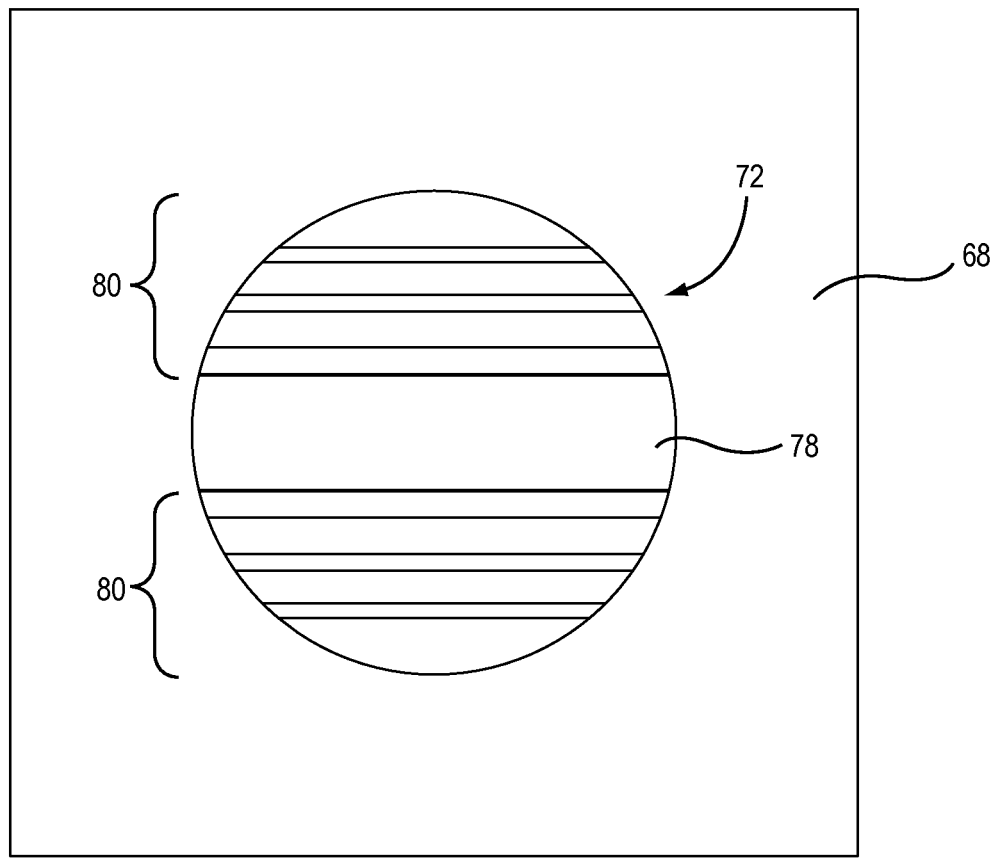

FIGS. 6F and 6G show the sensor cover 40 according to an additional embodiment of the present disclosure. The sensor cover 40 is substantially similar to that shown in FIGS. 6A through 6E, except that the sensor cover 40 is square instead of circular, and the first Fresnel lens 70 and the second Fresnel lens 72 are circular instead of square. The diameter of the first Fresnel lens 70 and the second Fresnel lens 72 may be about 5 mm in some embodiments. While not shown, the sensor cover 40 may be provided in virtually any number of shapes and sizes, including but not limited to triangles, rectangles, polygons, or irregular closed shapes.

Figure 7:
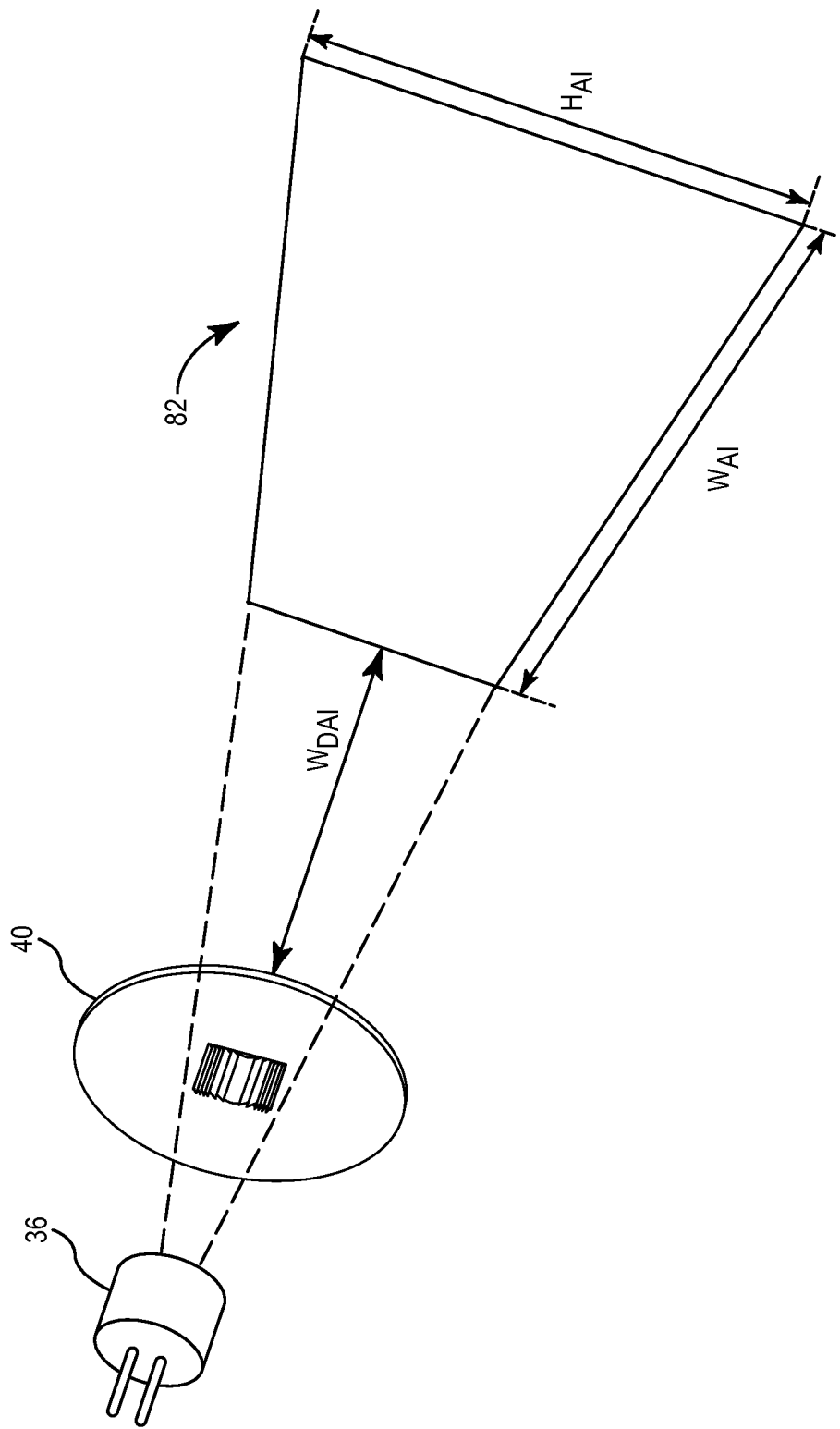
FIG. 7 illustrates the operation of a sensor cover according to one embodiment of the present disclosure.

FIG. 7 shows details of the operation of the sensor cover 40 according to one embodiment of the present disclosure. Specifically, FIG. 7 shows a desired portion of a task surface within an area of interest 82 in front of the sensor cover 40, and the occupancy sensor 36 aligned with a focal point at the back of the sensor cover 40. The desired portion of the task surface within the area of interest 82 is defined by a width $W_{AI}$ and a height $H_{AI}$, which define an area referred to as the field of view (FOV). While illustrated as a rectangular area, the FOV may also be defined as a circular area. Further, the FOV may be measured as an angle in some circumstances, which may be used to calculate a particular area as shown.

As discussed above, it is often desirable to maximize a FOV in order to provide the occupancy sensor 36 with as much information as possible about the surrounding environment, or to precisely define the FOV for a particular environment and/or application. Due to the design of the sensor cover 40, a working distance $WD_{AI}$ (defined as the distance from the occupancy sensor 36 to the desired portion of the area of interest 82) of 12.5 ft may provide uniform detection coverage over a desired portion of an area of interest 82 of about 18 ft×18 ft for a field of view of about 324 ft², which is substantially larger than a uniform detection area achievable by conventional means. In an additional embodiment, a working distance $WD_{AI}$ of 21.5 ft may provide uniform detection coverage over a desired portion of an area of interest 82 of about 30 ft×30 ft for a field of view of about 900 ft². Adjusting the Fresnel pattern of each one of the first Fresnel lens 70 and the second Fresnel lens 72 may allow a designer to tailor the particular FOV to a particular working distance, application, and/or environment, thereby increasing the utility of the sensor cover 40. While FOV is discussed above as defining a particular area, FOV may sometimes describe an angle subtended to the same area. For a circular area, FOV is frequently used for the angle subtended to the diameter of the circular area, which is about 90° in one embodiment.

Those skilled in the art will recognize improvements and modifications to the preferred embodiments of the present disclosure. All such improvements and modifications are considered within the scope of the concepts disclosed herein and the claims that follow.

What is claimed is:

1. A sensor module for a lighting fixture comprising:
    a module housing configured to be mounted to the lighting fixture;
    a light sensor mounted in the module housing; and
    a sensor cover over the light sensor and comprising:
        a first surface oriented to face a task surface within an area of interest and comprising a first Fresnel lens having a plurality of Fresnel ridges oriented in a first direction; and
        a second surface opposite the first surface and comprising a second Fresnel lens having a plurality of Fresnel ridges oriented in a second direction, which is different from the first direction.

2. The sensor module of claim 1 wherein the first direction is perpendicular to the second direction.

3. The sensor module of claim 1 wherein a pattern of the plurality of Fresnel ridges of the first Fresnel lens is different from a pattern of the plurality of Fresnel ridges of the second Fresnel lens.

4. The sensor module of claim 1 wherein the first surface and the second surface of the sensor cover are substantially flat.

5. The sensor module of claim 1 wherein the light sensor is an infrared occupancy sensor.

6. The sensor module of claim 1 further comprising an additional light sensor.

7. The sensor module of claim 6 further comprising a light pipe configured to direct light from the area of interest to the additional light sensor.

8. The sensor module of claim 7 wherein the additional light sensor is an ambient light sensor.

9. The sensor module of claim 1 wherein each one of the first plurality of lens sections and the second plurality of lens sections are configured to pass substantially the same amount of light to the light sensor.

10. The sensor module of claim 1 wherein the sensor cover provides a field of view corresponding to a circular area greater than 324 ft² for a working distance of about 12.5 ft.

11. The sensor module of claim 1 wherein the sensor cover provides a field of view corresponding to a circular area greater than 900 ft² for a working distance of about 21.5 ft.

12. A lighting fixture comprising:
    a light source;
    a housing coupled to the light source and comprising an opening through which light generated by the light source is emitted;
    a module housing configured to be mounted to the lighting fixture;
    a light sensor mounted in the module housing; and
    a sensor cover over the light sensor, the sensor cover comprising:
        a first surface oriented to face a task surface within an area of interest and comprising a first Fresnel lens having a plurality of Fresnel ridges oriented in a first direction; and
        a second surface opposite the first surface and comprising a second Fresnel lens having a plurality of Fresnel ridges oriented in a second direction, which is different from the first direction.

13. The lighting fixture of claim 12 wherein the sensor cover provides a field of view corresponding to a circular area greater than 324 ft² for a working distance of about 12.5 ft.

14. The lighting fixture of claim 12 wherein the sensor cover provides a field of view corresponding to a circular area greater than 900 ft² for a working distance of about 21.5 ft.

15. The lighting fixture of claim 12 wherein the first direction is perpendicular to the second direction.

16. The lighting fixture of claim 12 wherein a pattern of the plurality of Fresnel ridges of the first Fresnel lens is different from a pattern of the plurality of Fresnel ridges of the second Fresnel lens.

17. The lighting fixture of claim 12 wherein the first surface and the second surface of the sensor cover are substantially flat.

18. The lighting fixture of claim 12 wherein the light sensor is an infrared occupancy sensor.

19. The lighting fixture of claim 12 further comprising control circuitry configured to receive one or more measurements from the light sensor and adjust a light output of the light source based on the one or more measurements.

20. The lighting fixture of claim 12 further comprising an additional light sensor.

21. The lighting fixture of claim 20 further comprising a light pipe configured to direct light from the area of interest to the additional light sensor.

22. The lighting fixture of claim 21 wherein the additional light sensor is an ambient light sensor.

23. The lighting fixture of claim 12 wherein the light source is a light emitting diode (LED) light source.

* * * * *